March 1, 1932. G. D. BRADSHAW 1,847,305
FLUID SEPARATOR
Filed May 16, 1927  2 Sheets-Sheet 1

INVENTOR:
Grant D. Bradshaw
By E. J. Andrews
Att'y.

March 1, 1932.    G. D. BRADSHAW    1,847,305
FLUID SEPARATOR
Filed May 16, 1927    2 Sheets-Sheet 2

INVENTOR:
Grant D. Bradshaw
By E J Andrews
Att'y.

Patented Mar. 1, 1932

1,847,305

UNITED STATES PATENT OFFICE

GRANT D. BRADSHAW, OF PITTSBURGH, PENNSYLVANIA, ASSIGNOR TO BLAW-KNOX COMPANY, OF BLAWNOX, PENNSYLVANIA, A CORPORATION OF NEW JERSEY

FLUID SEPARATOR

Application filed May 16, 1927. Serial No. 191,582.

This invention relates to improvements in fluid separators and has for its object the production of means for more perfectly eliminating the liquids and other impurities from various gases. The invention is directed towards properly distributing the gas so that it will pass through all portions of the purifying means at substantially the same speed, and thus to increase the capacity of the separator as well as to improve the effectiveness thereof.

Figure 1:
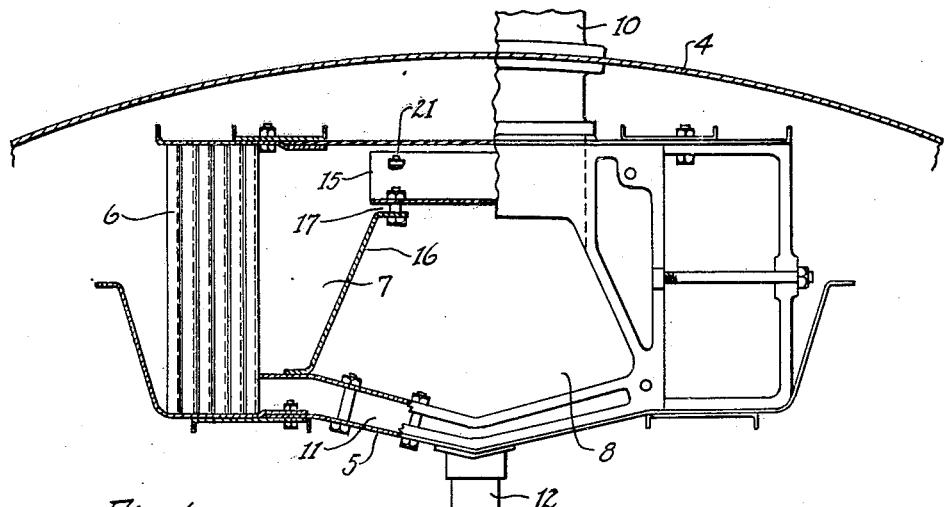
Figure 2:
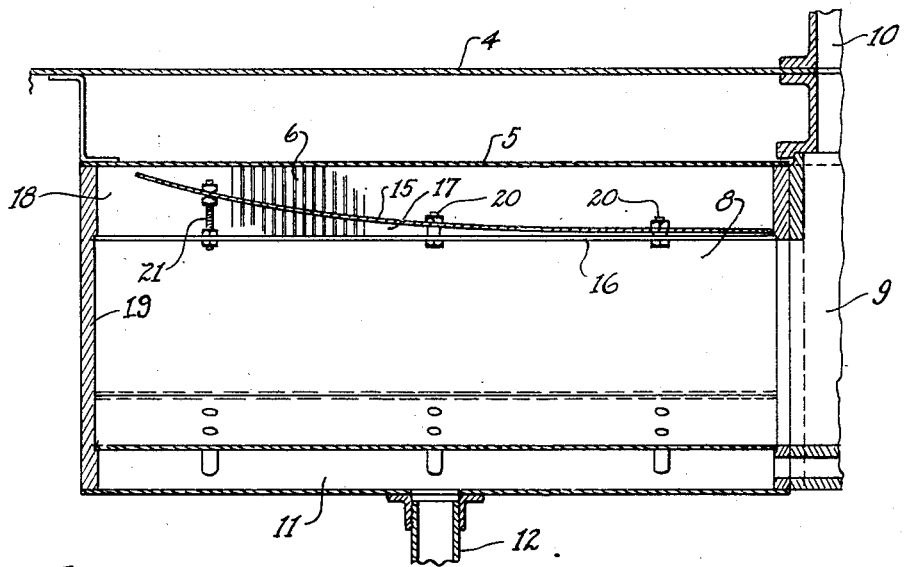
Figure 3:
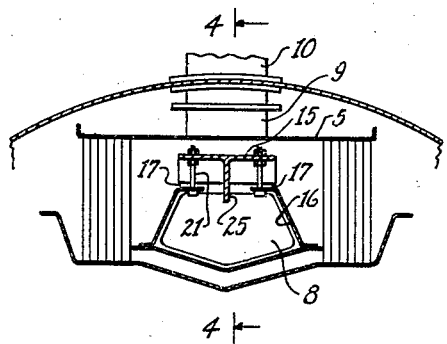
Figure 4:
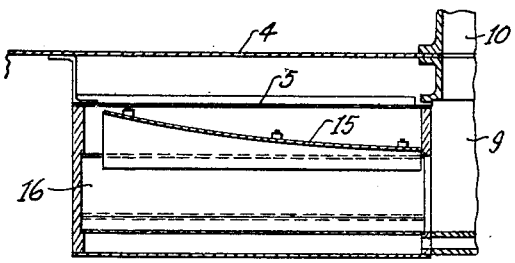
Figure 5:
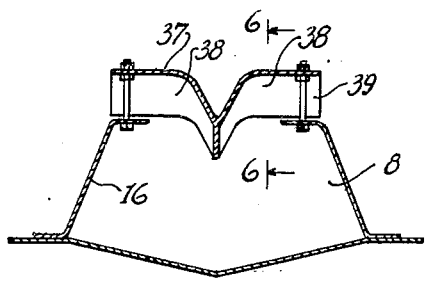
Figure 6:

Of the accompanying drawings Fig. 1 is an end view of a separator section and the outlet with a portion of the outlet broken away, which embodies the features of my invention; Fig. 2 is a longitudinal section of a separator; Fig. 3 is a transverse sectional view of a slightly modified top plate of the separator inner conduit; Fig. 4 is a longitudinal sectional view along the line 4—4 of Fig. 3; and Figs. 5 and 6 are similar partial enlarged views of another modification in the top plate.

Although I have herein illustrated and described a separator for purifying steam as embodying my invention, yet it is to be understood that the invention is applicable to the separators for the purification of any fluids, particularly vapors or gases, and the term "separator" as used herein is intended to refer to any suitable form of separator or purifier wherein impurities, such as liquids or solid particles, are separated from the gas or vapor which it is desired to purify. The particular type of separator which I describe is what is known by the trade as the "Tracyfier".

This separator comprises a casing 5 in the sides of which are mounted banks of baffles 6. The separator when in use is ordinarily mounted within a boiler 4, and the steam passes through the baffles 6 into the interior chamber 7 and then, ordinarily, the steam passes through an outlet 9 to the outlet 10 of the boiler into the steam main of the system. As the steam passes through the baffles the moisture and other impurities therein are stopped in their flow by the baffles and they run downwardly into the passageway 11 and thence through a pipe 12, communicating with this passageway, to any point to which it is desired to discharge the liquid and the other impurities which are carried with the liquid.

However, with elongated separators, and with the outlet remote from one end, the rate of flow of steam through the baffles adjacent the outlet is greater than at more remote points. Hence, in order to properly distribute the steam so as to cause it to pass through all portions of the baffles substantially at the same speed, I provide means for retarding the flow of the steam more and more as the outlet is approached, and I thus increase the resistance to the flow as the outlet is approached at such a rate as to reduce the speed through the baffles near the outlet, without reducing materially the speed through the baffles near the remote end, and thus produce substantially uniform flow throughout all portions of the baffles.

To accomplish this I provide within the chamber 7 a conduit 8 running longitudinally within the chamber and communicating with the outlet 9. The conduit 8 comprises a bottom and side wall 16 extending from one end of the casing 5 to the other; but the top of the conduit comprises a plate 15. This plate is raised above the sides 16 of the inner conduit and this provides a passageway 17 for the steam to pass from the outlet chamber 7 into the conduit 8. And, to retard the flow of steam near the outlet 9, I position the outlet end of the plate 15 immediately above the plates 16, thus forming a very narrow slot for the steam to pass through at that end. At the other end of the separator, however, I position the end of the plate materially above the side plates 16, and thus provide a very wide opening at the outer end of the separator. I also terminate the plate 15 before the end plate 19 of the separator is reached, so as to leave an opening 18 through which the steam may pass freely into the inner conduit at that end. Intermediate the two ends I incline the plate more and more to the horizontal as the outlet is receded from so as to increase the width of the opening 17 at a much greater rate than the increase in distance from the outlet end of the plate. To accomplish this I provide for the top of the conduit 8 a yielding flat plate 15 which may be conveniently bent or sprung into the shape indicated, and provide bolts 20 and 21 for properly positioning the plate and connecting it with the edges 16. Near the outer end of the plate 15 I provide the bolts 21 by means of which the elevation of the plate 15 above the plate 16 may be adjusted to suit the needs.

It will thus be seen that I have provided means for retarding the flow of steam from the baffles to the outlet 9 more and more as the outlet is approached, and by the use of a flat yielding plate I am able to curve the plate somewhat as indicated and thus provide a steam inlet to the conduit which retards the steam at such a rate as to make the flow substantially uniform through all portions of the baffles.

In the use of these and similar separators it will be seen that the steam enters the inner conduit 8 through the passageways 17 on each side of the conduit. As a consequence there are two opposing streams of gas continuously entering the conduit and opposing each other and the efficiency of the system is decreased. To prevent this interference I provide a baffle 25 which extends substantially from one end to the other of the plate 15 and projects downwardly into the conduit 8. As a consequence the streams of gas strike on this plate and thus interference between them is prevented. This plate may be fixed to the top plate 15 in any suitable manner. I prefer to weld the two plates together.

To give more efficient stream lines to the plates, and thus to reduce the resistance of the gas entering the conduit 8 a modified form of top plate and baffle may be used. For instance, the top of the conduit may comprise a plate 37 which is bent as indicated in Figs. 5 and 6; or it may comprise two similar plates; so as to provide in either case the rounded surfaces 38 which produce the more efficient surface for directing the streams of gas as they enter through the openings 39.

I claim as my invention:

1. A steam separator comprising a hollow casing having openings in its walls, steam separating baffles mounted in said openings, a steam outlet connected to one end of said casing, an inner conduit in said casing, said conduit opening into said outlet, and said conduit having a narrow longitudinal opening through its wall extending substantially the entire length of the wall, said opening converging towards said outlet, the upper edge of said opening being convex.

2. A steam purifier comprising an elongated casing, steam purifying baffles mounted in the walls of said casing, an inner longitudinal conduit formed within said casing, the top of said conduit being spaced away from the sides of the conduit and thus providing elongated openings into said conduit, and a steam outlet fixed to said casing and communicating with said conduit, the portion of said top adjacent said outlet being nearer said sides than the portions of said top which are more remote from the outlet, and said top curving upwardly as said outlet is receded from.

3. A steam purifier comprising an elongated casing, steam purifier baffles mounted in the walls of said casing, an inner longitudinal chamber formed within said casing, a conduit mounted in said chamber the top of said conduit being spaced away from the sides of the conduit and thus providing elongated openings into said conduit, and a steam outlet fixed to said casing and communicating with said conduit; said top comprising a plate curving upwardly as the outlet is receded from.

4. A fluid separator comprising a casing, baffles mounted in said casing, a chamber within said casing, a conduit in said chamber, said conduit having an inlet on each side thereof, and a plate positioned in said conduit between said inlets.

5. A fluid receiver comprising a conduit, said conduit having a fluid outlet, and having an elongated fluid inlet on each side thereof, and a plate mounted in said casing between said inlets.

6. A fluid receiver as claimed in claim 5, in which said plate is extended longitudinally along the central portion of the top of said receiver and is fixed to said top.

7. A steam purifier comprising an elongated casing, steam purifier baffles mounted in the walls of said casing, an inner longitudinal chamber formed within said casing, a conduit mounted in said chamber the top of said conduit being spaced away from the sides of the conduit and thus providing elongated openings into said passageway, and a steam outlet fixed to said casing and communicating with said conduit, and a plate projecting downwardly from said top between said openings.

8. A steam purifier comprising an elongated casing, steam purifier baffles mounted in the walls of said casing, an inner longitudinal chamber formed within said casing, a conduit mounted in said chamber the top of said conduit being spaced away from the sides of the conduit and thus providing elongated openings into said chamber, a steam outlet fixed to said casing and communicating with said conduit, the central longitudinal portion of said top projecting downwardly into said conduit between said openings.

9. A fluid separator having an inner steam chamber, a steam conduit within said chamber, said conduit comprising bottom and side walls and a top wall elevated above said side walls, providing slots for the passage of steam between said side walls and said top wall, said top wall comprising a pliable plate fixed above said side walls but with one end curving upwardly away from said side walls, and said top plate being shorter than said side walls, whereby a steam opening into said conduit is provided across the end of said conduit.

10. A fluid separator having an inner steam chamber, a steam conduit within said chamber, said conduit comprising bottom and side walls and a top wall elevated above the side walls, providing slots for the passage of steam between said side walls and said top wall, said top wall comprising a pliable plate fixed above said side walls but with one end curving upwardly away from said side walls, and a plate projecting downwardly from the longitudinal central portion of said pliable plate into said conduit.

11. A fluid separator having an inner steam chamber, a steam conduit within said chamber, said conduit comprising bottom and side walls and a top wall elevated above said side walls, providing slots for the passage of steam between said side walls and said top wall, said top wall comprising a pliable plate fixed above said side walls but with one end curving upwardly away from said side walls, and a steam outlet remote from one end of the separator and communicating with said conduit, said plate curving upwardly as it passes away from said outlet.

12. A fluid separator as claimed in claim 11, including means for adjusting the elevation of the upper end of said plate.

In testimony whereof, I hereunto set my hand.

GRANT D. BRADSHAW.